(12) United States Patent
Xia et al.

(10) Patent No.: US 9,299,263 B2
(45) Date of Patent: Mar. 29, 2016

(54) METHOD AND SYSTEM OF LEARNING DRAWING GRAPHIC FIGURES AND APPLICATIONS OF GAMES

(76) Inventors: Tiejun J. Xia, Richardson, TX (US); Changjie Wang, Plano, TX (US)

( * ) Notice: Subject to any disclaimer, the term of this patent is extended or adjusted under 35 U.S.C. 154(b) by 207 days.

(21) Appl. No.: 13/608,160

(22) Filed: Sep. 10, 2012

(65) Prior Publication Data
US 2014/0071057 A1    Mar. 13, 2014

(51) Int. Cl.
| | | |
|---|---|---|
| G06F 3/041 | (2006.01) | |
| G09B 5/02 | (2006.01) | |
| G09B 11/00 | (2006.01) | |
| A63F 13/2145 | (2014.01) | |

(52) U.S. Cl.
CPC ............. *G09B 5/02* (2013.01); *A63F 13/2145* (2014.09); *G06F 3/041* (2013.01); *G09B 11/00* (2013.01)

(58) Field of Classification Search
CPC ....................................................... G06F 3/041
USPC ...................... 345/1.1–1.3, 2.1–2.3, 173–179
See application file for complete search history.

(56) References Cited

U.S. PATENT DOCUMENTS

| | | | |
|---|---|---|---|
| 2002/0097338 A1* | 7/2002 | Voyer | 348/564 |
| 2009/0136098 A1* | 5/2009 | Mathan et al. | 382/128 |
| 2009/0305208 A1* | 12/2009 | Stewart et al. | 434/258 |
| 2010/0127991 A1* | 5/2010 | Yee | 345/173 |
| 2012/0327110 A1* | 12/2012 | Kang et al. | 345/620 |
| 2013/0251264 A1* | 9/2013 | Forcke et al. | 382/187 |

* cited by examiner

*Primary Examiner* — Michael Pervan
*Assistant Examiner* — Andrew Lee

(57) ABSTRACT

The present disclosure provides a method that includes displaying a first graphic figure for a period of time to a person; receiving a second graphic figure by a touch screen of a first electronic device, wherein the second graphic figure is drawn on the touch screen by the person based on the first graphic figure after the first graphic figure disappears; comparing the first and second graphic figures to determine a difference between the first and second graphic figures; and showing a result associated with the difference by the first electronic device.

22 Claims, 15 Drawing Sheets

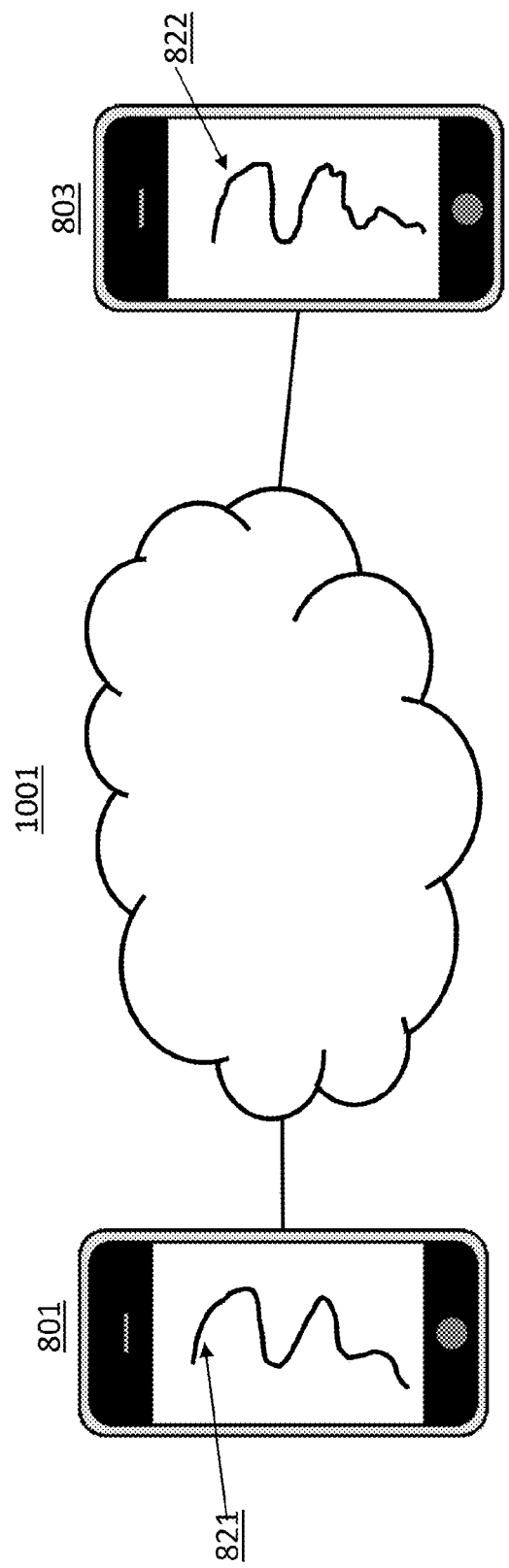

METHOD AND SYSTEM OF LEARNING DRAWING GRAPHIC FIGURES AND APPLICATIONS OF GAMES

FIELD OF INVENTION

This invention relates to a method and a system for correlating hand-drawn figures in electronic messaging system, and specifically relates to a method to help people learning drawing graphic figures more efficiently. The method can be used in fields such as education and entertainment.

BACKGROUND

Text messages or pictures are operative to be communicated between mobile devices. For example, email messages and photos are sent or received by a mobile device, such as a smart phone. However, communicating other messages, especially hand drawn figures between the mobile devices with competing and challenging factors are not developed. A method for communicating and comparing the hand drawn figures and devices enabling the method are desired.

BRIEF DESCRIPTION OF THE DRAWINGS

The present disclosure is best understood from the following detailed description when read with the accompanying figures. It is emphasized that, in accordance with the standard practice in the industry, various features are not drawn to scale. Various features may be arbitrarily drawn for clarity of discussion. Furthermore, all features may not be shown in all drawings for simplicity.

FIG. 15 is a schematic view of a gaming method involving two players with a network according to aspects of the present disclosure in one or more embodiments.

DETAILED DESCRIPTION

In the following description, exemplary embodiments of the learning drawing method and its applications to gaming methods of the present invention are provided for different scenarios, such as efficiently learning drawing graphic figures, gaming involving one player, gaming involving two or more players, learning drawing and gaming using one device or two devices connected via network, graphic figures including hand drawing curves and pre-stored pictures, devices including smart phones and tablet computers, etc.

Newly developed touch screen, which has been used in numerous electronic devices, such as cellular phones, tablet computers, instruments, etc., provides effective approaches for the electronic devices to accept input from human-beings and to display contents to human-beings. With this in mind new methods for education and entertainment can be invented.

Figure 1:
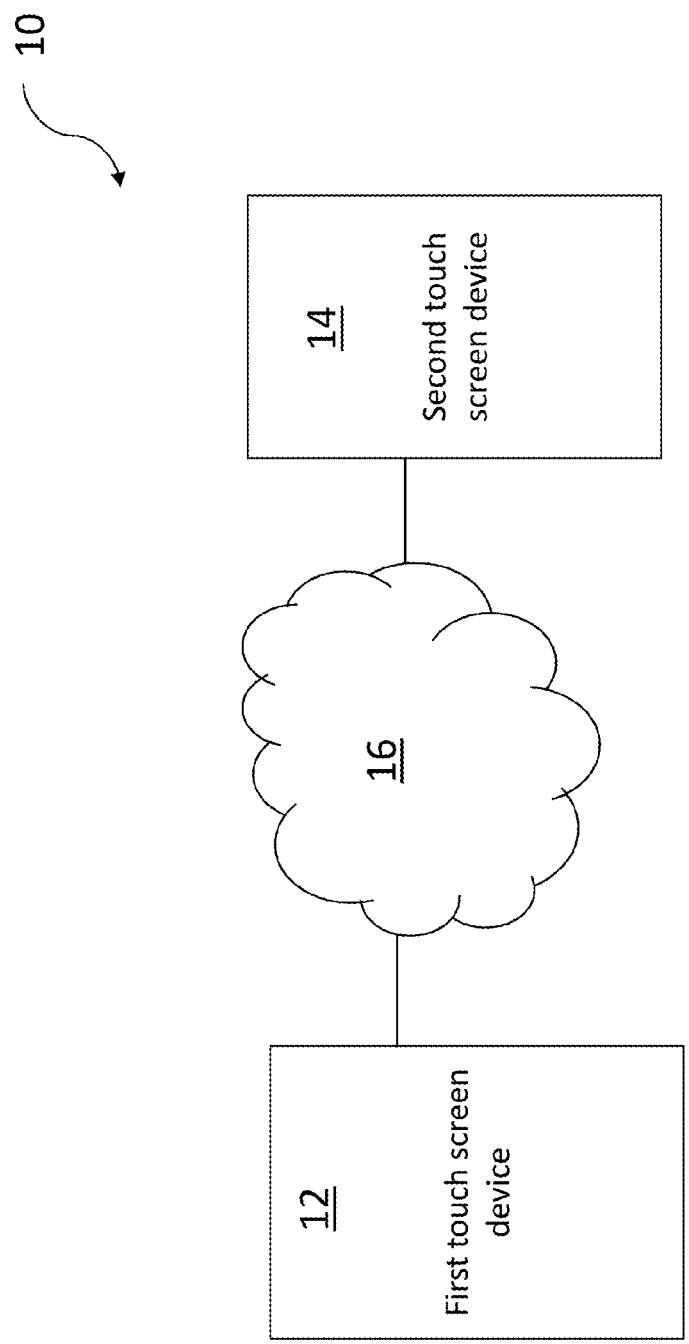
FIG. 1 is a schematic view of a hand drawn figure system constructed according to aspects of the present disclosure in one or more embodiments.

FIG. 1 is a schematic view of a hand drawn figure system 10 constructed according to aspects of the present disclosure in one or more embodiments. The system 10 illustrates a general system architecture for hand drawn figure communication and processing. The system 10 and the method for hand drawn figure communication and processing to be implemented in the system 10 are described collectively with reference to FIG. 1.

The system 10 includes one or more touch screen devices, such as 12 and 14, operable to be coupled together through a data communication network 16. In the present embodiment, the system 10 includes two touch screen devices, respectively referred to as a first touch screen device 12 and a second touch screen device 14. A touch screen device (such as 12 or 14) refers to an electronic device having a touch screen for input and is operable to communicate with other similar devices through the data communication network 16. In one example, the touch screen device 12 (or 14) includes a mobile phone (such as smart phone), a tablet computer (such as an iPad), a laptop computer or a desktop computer.

Figure 2:
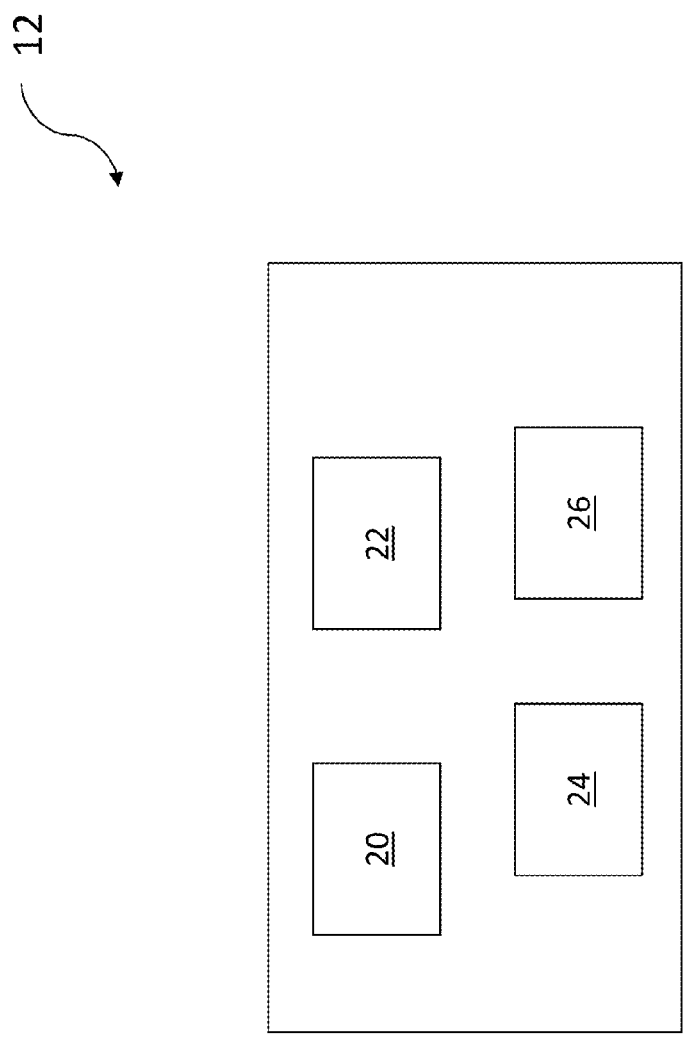
FIG. 2 illustrates a schematic view of a touch screen device constructed according to aspects of the present disclosure in one embodiment.

Further illustrated in FIG. 2 is the touch screen device 12 (or 14). The touch screen device 12 includes a transmission module 20 operable to receive a hand-drawn figure from another mobile device through a data transmission network 16. The touch screen device 12 includes a touch screen 22 operable to receive a second hand-drawn figure entered by user. The touch screen device 12 also includes a figure processing module 24 operable to compare and correlate the first hand-drawn figure and the second hand-drawn figure and generate a comparing parameter based on the comparing and correlating. The touch screen device 12 may further include a display module 26 operable to display a hand drawn figure on the touch screen for a predefined duration. Various elements of the touch screen device 12 are integrated together to be functional to implement various operations of the disclosed method.

The hand drawn figure to be received, entered, displayed and processed by the touch screen device includes any hand-drawn figure, such as a readable symbol, a picture, or combinations thereof. In one embodiment, the readable symbol includes one of a letter, a number, a character, and combinations thereof. In another embodiment, the picture includes one of a curved line, a figure, and combinations thereof.

Still referring to FIG. 1, the data communication network 16 includes one communication mechanism selected from the Internet, wireless relay connection (used for mobile phones), intranet, WiFi connection, Bluetooth, cable connection, or combinations thereof. In one example, two touch screen devices (12 and 14) are two tablet computers operable to be coupled together through WiFi connection. In another example, two touch screen devices (12 and 14) are two smart phones operable to be coupled together through a wireless relay connection.

In another embodiment, the system 10 includes only one touch screen device for function operations to be implemented thereon by users, such as two users in one example. In another embodiment, the system 10 includes a plurality of touch screen devices operable to be coupled together through the data communication network 16. In this case, one touch screen device functions as the first touch screen device 12 and the rest devices function as the second touch screen device 14, each being independently communicating with the first touch screen device 12.

Figure 3:
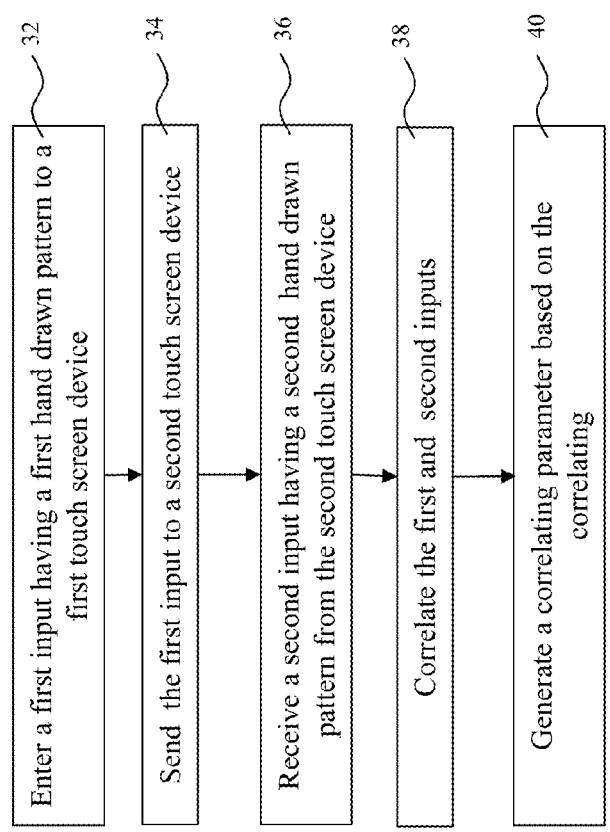
FIG. 3 is a flowchart of a method constructed according to aspects of the present disclosure in one or more embodiments.

FIG. 3 is a flowchart of a method 30 constructed according to aspects of the present disclosure in one or more embodiments. The method 30 is implementable in the hand drawn figure system 10 of FIG. 1. The method 30 is described with reference to FIGS. 1 through 3. The method 30 includes an operation 32 to enter a first input that has a hand drawn figure to the first touch screen device 12. The hand drawn figure may be a symbol, a picture or combinations thereof. The entering of the first input is performed by a first user in a hand drawn mode.

The method 30 includes an operation 34 to send the first input from the first touch screen device 12 to the second touch screen device 14 through the data communication network 16. The operation 34 may be triggered by pressing a button of the first touch screen device 12, touching a symbol on the touch screen of the first device 12, or other proper action applicable to the first touch screen device 12. In the present embodiment, the operation 34 is executed by the first user.

The method 30 includes an operation 36 to receive a second input having a second hand drawn figure by the first touch screen device 12 from the second touch screen device 14 through the data communication network 16. The operation 34 may be triggered by a second user who is accessing the second touch screen device 14.

Once the first input is received by the second touch screen device 14, the first input is displayed in the display component of the second touch screen device 14 for a predefined duration, such as 3 seconds. The display duration may be related to the complexity of the first input. When the first input is more complicated, the display duration is longer. The second user enters the second input based on the first input and sends the second input to the first touch screen device through the data communication network 16. In one embodiment, the second input is a mimic of the first input. For example where the first input is a hand drawn picture, the second input is another picture hand drawn by the second user to mimic the hand drawn figure of the first input. In another embodiment, the second input is hand drawn message that is related to the hand drawn figure of the first input. For example where the first input is a hand drawn picture (such as a picture of a tree), the second input is a symbol (such as "tree" in English or a text in other language) that interpreters the meaning or representation of the hand drawn figure of the first input. In yet another embodiment, the second input is hand drawn message that is related to the hand drawn symbol of the first input. For example where the first input is a hand drawn symbol (such as a word "tree" in English), the second input is another symbol (such as a text for a tree in another language) that translates the meaning of the hand drawn symbol of the first input.

The method 30 includes an operation 38 by comparing and/or correlating the first input and the second input. The comparing and correlating may be implemented by a figure processing module 24 of the first touch screen device 12. In various embodiments, the comparing and correlating process may include picture processing (such as mapping); relating (such as relating a word to a picture); translating (such as translating a word or a phrase in one language to a word or phrase in another language); or a combinations thereof.

The method 30 also includes an operation 40 by generating a comparing parameter (or correlating parameter) based on the comparing and correlating process. In one embodiment, the comparing parameter is a numerical index, such as a score to evaluate how well the second user achieves. In another embodiment, the comparing parameter may alternatively or additionally include a message (such as "well done") associated with the comparing result. For example, when the score is in a certain range, a text message is provided with the respective score. The method 30 may also include an operation to send the comparing parameter from the first touch screen device 12 to the second touch screen device 14.

In an alternative embodiment, the operations 38 and 40 are implemented in the second touch screen device 14. In this case, the operation 36 is eliminated. Instead, the method 30 includes another operation to receive the comparing parameter by the first touch screen device 12 from the second touch screen device 12 after the operations 38 and 40. In furtherance of the embodiment, the comparing parameter is also displayed in the display component of the first touch screen device 12 and is displayed in the display component of the second touch screen device 14 as well.

In an alternative embodiment, various operations are implemented in a single touch screen device. In this case, those operations related to communicating between two touch screen devices are optional or eliminated. Corresponding method and device to implement the same are described with reference to FIGS. 4 and 5. Languages for similar or equivalent features may be eliminated for simplicity.

Figure 4:
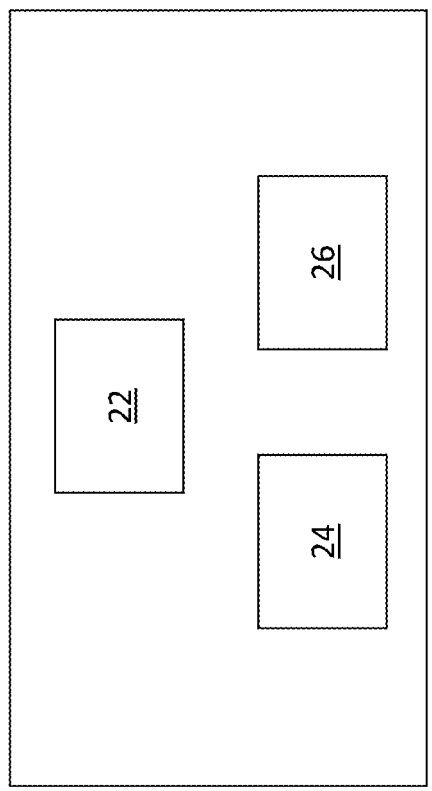
FIG. 4 illustrates a schematic view of a touch screen device constructed according to aspects of the present disclosure in another embodiment.

FIG. 4 illustrates a schematic view of a touch screen device 46 according to one embodiment. The touch screen device 46 is an electronic device having a touch screen for input. In various examples, the touch screen device 46 includes a mobile phone, a tablet computer, a laptop computer or a desktop computer. The touch screen device 46 includes a touch screen 22 operable to receive a second hand-drawn figure entered by user. The touch screen device 46 includes a figure processing module 24 operable to compare and correlate the first hand-drawn figure and the second hand-drawn figure and generate a comparing parameter based on the comparing and correlating. The touch screen device 46 further includes a display module 26 operable to display a hand drawn figure on the touch screen for a predefined duration. Various elements of the touch screen device 46 are integrated together to be functional to implement various operations of disclosed method.

The hand drawn figure to be received, entered, displayed and processed by the touch screen device 46 includes any hand-drawn figure, such as a readable symbol, a picture, or combinations thereof. In one embodiment, the readable symbol includes one of a letter, a number, a character, and combinations thereof. In another embodiment, the picture includes one of a curved line, a figure, and combinations thereof.

Figure 5:
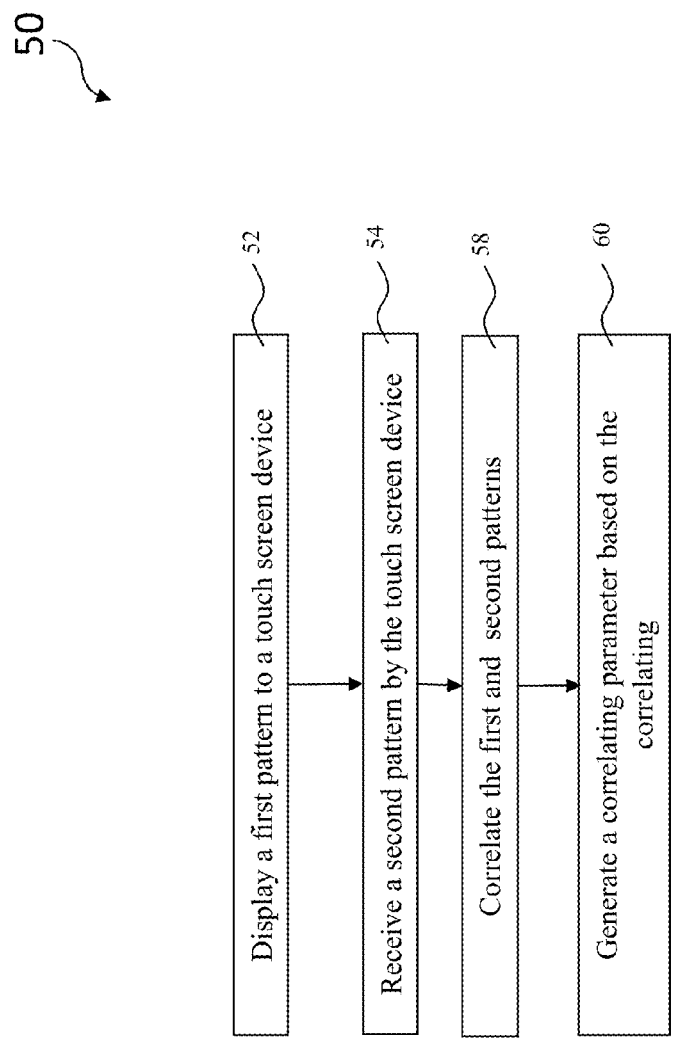
FIG. 5 is a flowchart of a method constructed according to aspects of the present disclosure in other embodiments.

FIG. 5 is a flowchart of a method 50 constructed according to aspects of the present disclosure in other embodiments. The method 50 is implementable in the touch screen device 46 of FIG. 4. The method 5 includes an operation 52 to display a first figure on the touch screen device 46 for a period of time. In one embodiment, the first figure is a graphic figure hand drawn by a first person to the touch screen device 46. The hand drawn figure may be a symbol, a picture or combinations thereof. In an alternative embodiment, the first figure is provided from a figure database stored in a media integrated in or coupled with the touch screen device. It is noted that the first figure is only displayed for the period of time, which can be set, such as predefined at the beginning of the method 50 by the first person, or provided by default.

The method 50 includes an operation 54 to receive a second figure by the touch screen device 46. The second figure is a graphic figure and may include a readable symbol, a picture, or combinations thereof. The second figure is hand drawn to the touch screen device 46 by a second person. This input method is also referred to as touch screen mode. When the first figure is provided by the first person, the second person is different from the second person.

The second person looks at the first figure during the period of time when the first figure is displayed and tries to remember (memorize) the first figure. After the first figure disappears, the second person drew the second figure based on the first figure, especially based on the memorizing.

The method 50 includes an operation 58 by correlating (such as comparing) the first figure and the second figure. The correlating may be implemented by a figure processing module 24 of the first touch screen device 46. In various embodiments, the comparing and correlating process may include picture processing (such as mapping); relating (such as relating a word to a picture); translating (such as translating a word or a phrase in one language to a word or phrase in another language); or a combinations thereof.

The method 50 also includes an operation 60 by generating a correlating parameter (or comparing parameter) based on the correlating process. In one embodiment, the comparing parameter is a numerical index, such as a score to evaluate how well the second user achieves. In another embodiment, the comparing parameter may alternatively or additionally include a message associated with the comparing result. For example, when the score is in a certain range, a text message is provided with the respective score.

Figure 6:
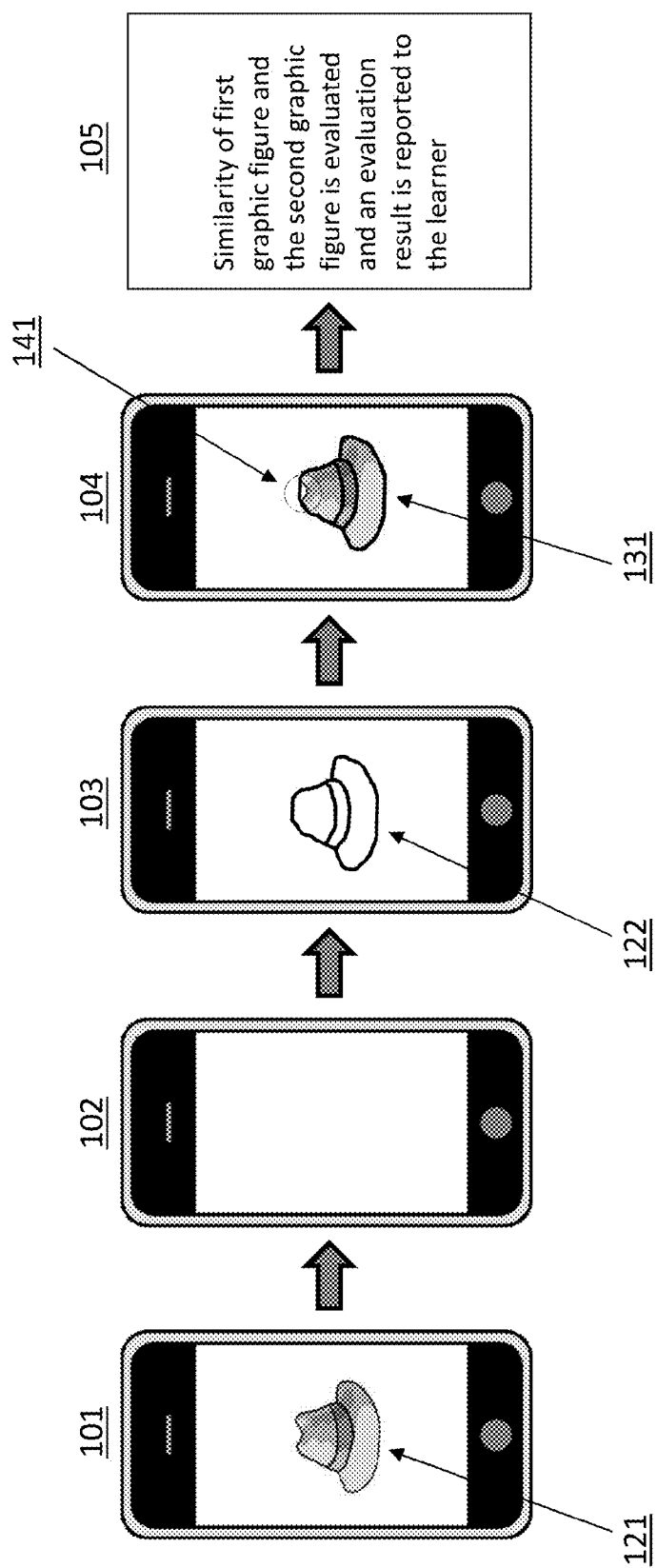
FIG. 6 is a schematic view of a learning drawing method according to aspects of the present disclosure in one or more embodiments.

FIG. 6 is a schematic view of a method of learning drawing graphic figures. First a first graphic figure 121, which is a graphic figure for a learner to learn, is shown on a screen of a device (101). The first graphic figure 121 disappears after a period of time, which can be set at the beginning of the process learning drawing graphic figures (102). The learner looks at the first graphic figure during the time period that the first graphic figure 121 is shown on the screen and tries to remember the contents of the first graphic figure 121. After the first figure disappears the learner draws a second graphic figure 122 on a touch screen to be as similar as possible to the first graphic figure (103). The second graphic figure 122 drawn by the learner is recorded. Then both the first graphic figure and the second graphic figure (collectively referred to as 131) are displayed on the screen and differences 141 between the two figures are indicated (104). The similarity of the first graphic figure and the second graphic figure is evaluated and an evaluation result is reported to the learner (105). This process helps the learner to grasp the skills to draw graphic figures quickly.

In various embodiments, at least one of the first device and the second device is an electric device, such as a touch screen phone, a touch screen tablet computer, a laptop computer, a flat panel display, or a desktop computer. The device displaying the first graphic figure and the device with a touch screen on which the learner draws the second graphic figure are not necessary the same device. In other embodiments, the first graphic figure may include a line, a curve, a drawing, a symbol, a picture, or combinations thereof.

Figure 7:
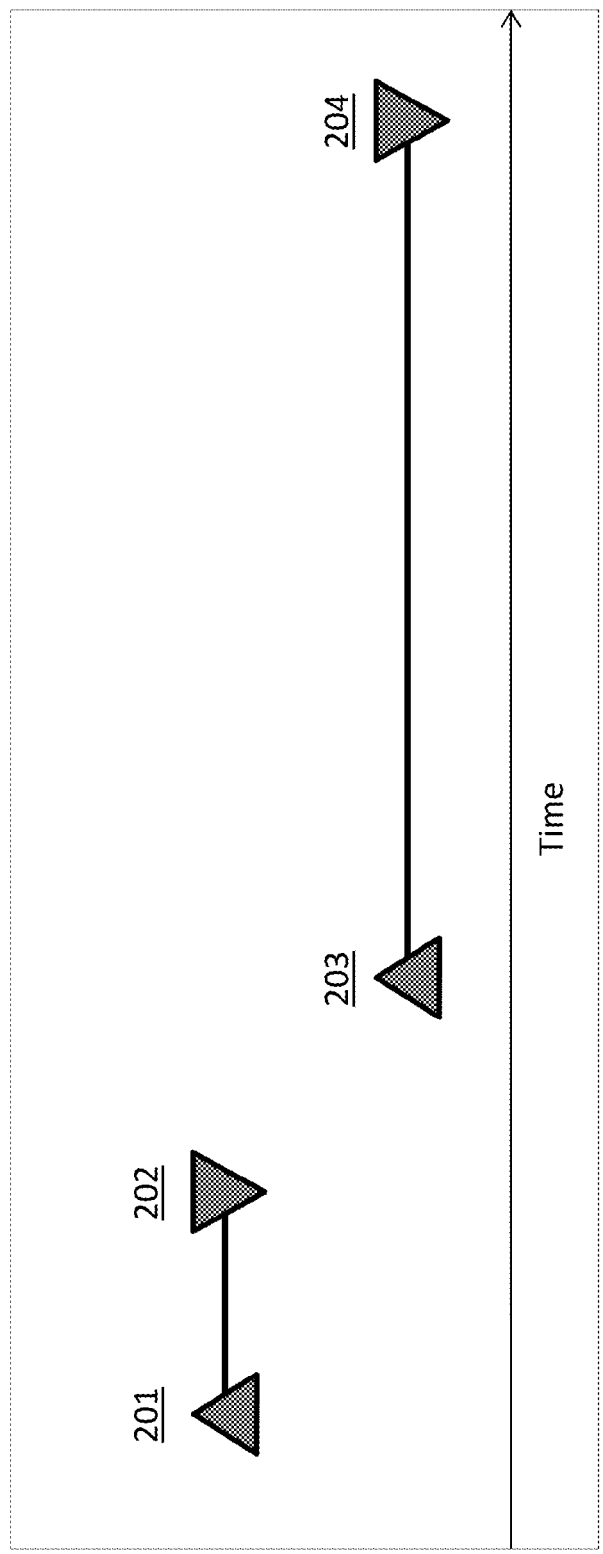
FIG. 7 shows the time period relationship between the displaying time period of the first graphic figure and the drawing time period of the second graphic figure.

FIG. 7 shows a time relationship for the displaying time period of the first graphic figure and the time period in which the second graphic figure is completed in FIG. 6. Time point 201 indicates the beginning of a duration when the first figure is displayed. Time point 202 indicates when the first figure disappears. Time point 203 indicates the beginning of the second figure being drawn. Time point 204 indicates when drawing the second figure finishes. The time period between time point 201 and time point 202 can be zero or a non-zero value. Time point 202 is before time point 203 in general.

Figure 8:
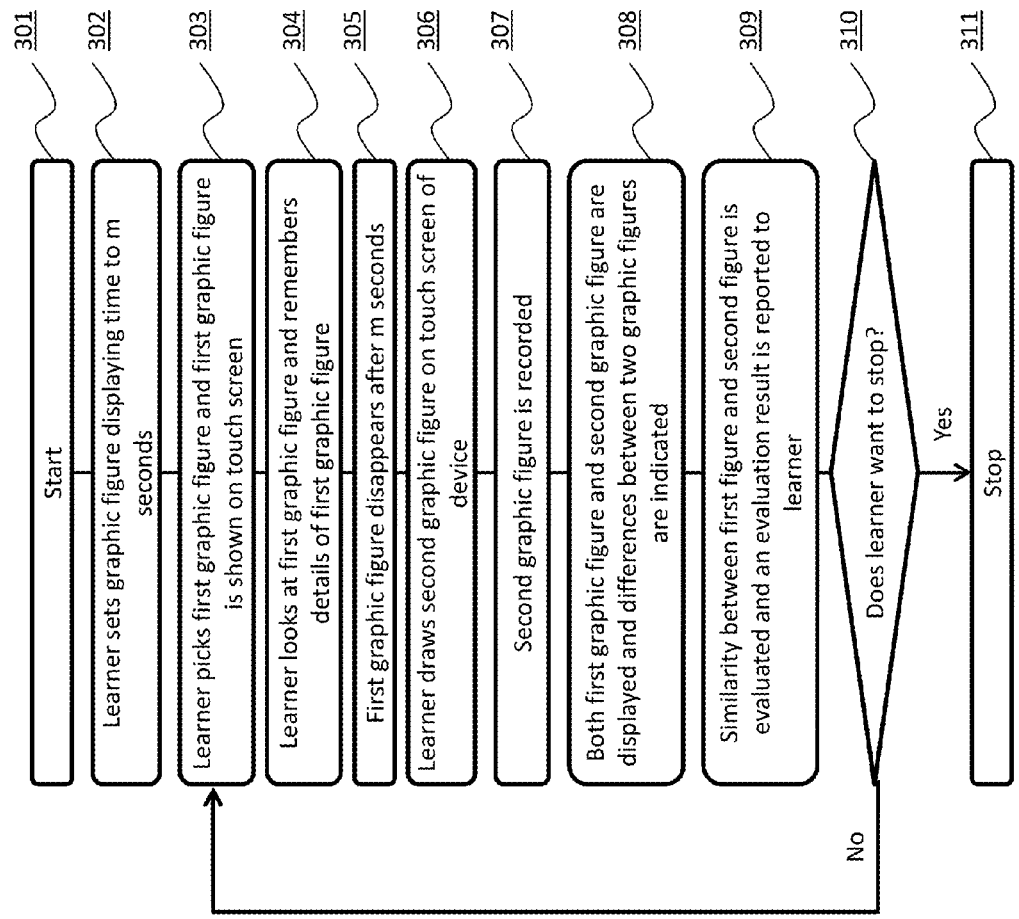
FIG. 8 is a flowchart of a learning drawing method according to aspects of the present disclosure in one embodiment.

FIG. 8 is a flowchart of the exemplary procedure of the method of learning drawing graphic figures as shown in FIG. 6. When the learning process is started (301), the time period of the first graphic figure being shown on the screen is set (302) or preset by default. A first graphic figure, picked by a learner for example, is displayed on a screen of a device (303). The learner looks at the first graphic figure and tries to remember the contents of the first figure (304). The first graphic figure disappears after the time period set at the beginning of the process (305). After the first graphic figure disappears the learner tries to re-draw the first graphic figure by drawing a second graphic figure on a touch screen of a device (306). The second graphic figure is recorded (307). Then both the first graphic figure and the second graphic figure are displayed and differences between the two figures are indicated (308). A similarity between the first graphic figure and the second graphic figure is evaluated and an evaluation result is reported to the learner, helping the learner to learn the differences between the first figure and the second figure the learner has just drawn (309). After that the program checks if the player wants to stop the process of learning drawing graphic figure (310). If the answer is "No", the process goes back to step 303. If the answer is "Yes", the learning process is stopped (311).

Figure 9:
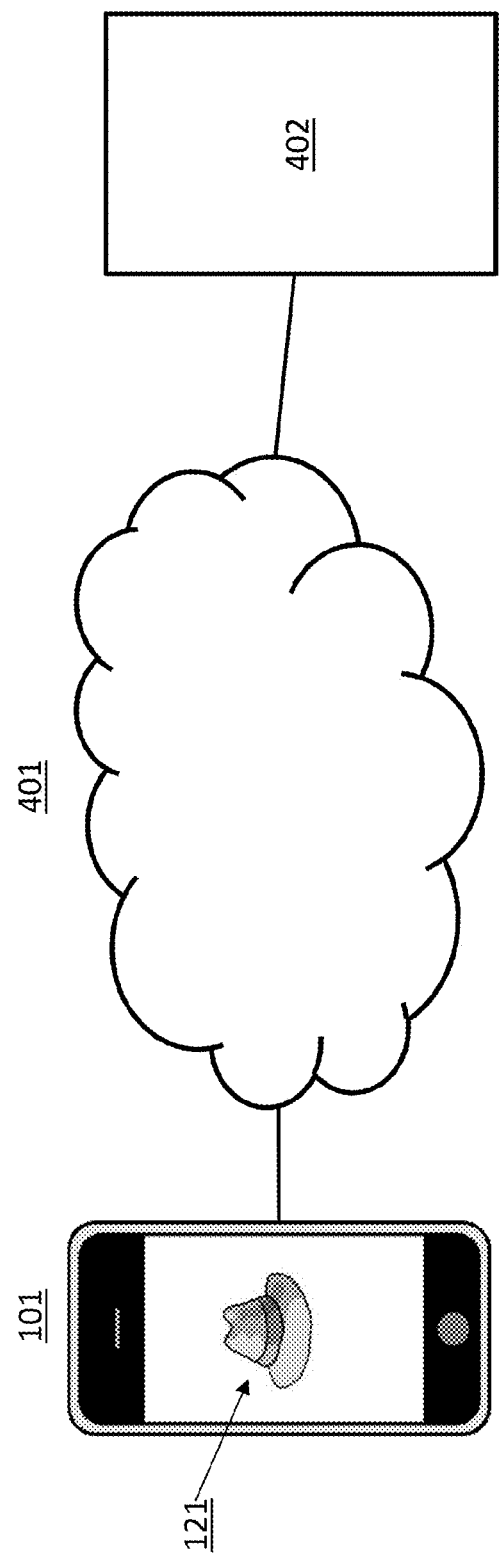
FIG. 9 is a schematic view of a learning method involving a network according to aspects of the present disclosure in one or more embodiments.

It is not necessary that the first graphic figure can be picked only from the local device with a database as shown in FIG. 6. As shown in FIG. 9 the device is able to receive the first graphic figure 121 from a remote memory device with a database 402 via a communication network 401. The communication network 401 can be a wireless phone network, Internet, or other communication networks. With the communication network the display device, the device with a touch screen, and the memory device are able to transmit graphic figures and other information to each other and are able to accept graphic figures and other information from each other, and are able to transmit and accept graphic figures and other information to and from the network according to various embodiments. The method of FIG. 8 may be an embodiment of the method 30 or the method 50.

Figure 10:
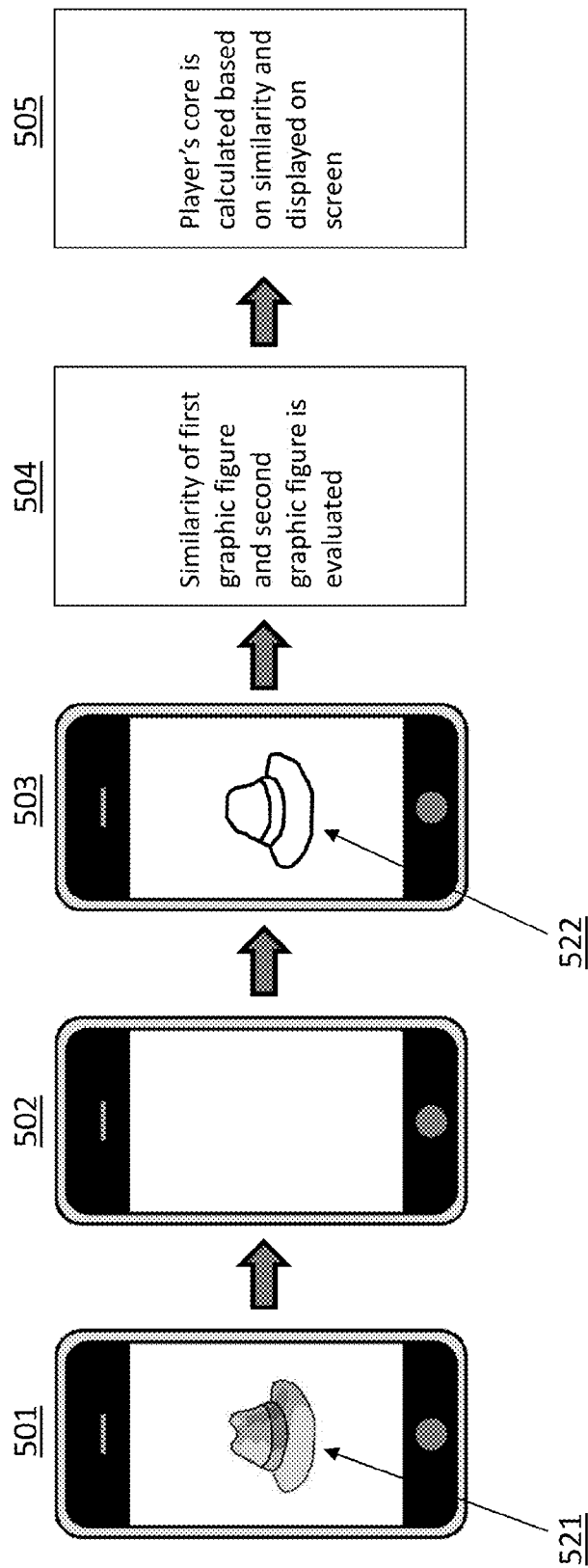
FIG. 10 is a schematic view of a gaming method involving one player according to aspects of the present disclosure in one or more embodiments.

FIG. 10 shows an exemplary embodiment of this invention's application to entertainment—a gaming method involving one player. A first graphic figure 521 is picked randomly from a database and displayed on a screen of a device (501). The first graphic figure disappears after a period of time, which can be set at the beginning of the game (502).

A game player looks at the first graphic figure during the time period when the first graphic figure is shown on the screen and remembers the contents of the first graphic figure. After the first graphic figure disappears the player draws a second graphic figure 522 on a touch screen of a device to be as similar as possible to the first figure (503). The second graphic figure drawn by the player is recorded. A similarity between the second graphic figure and the first graphic figure is evaluated (504). A score is calculated based on the evaluation result (505). This finishes one run of the game. The number of runs in a game can be set by the game player. The device displaying the first graphic figure and the device with a touch screen on which the game player draws the second graphic figure are not necessary the same device.

Figure 11:
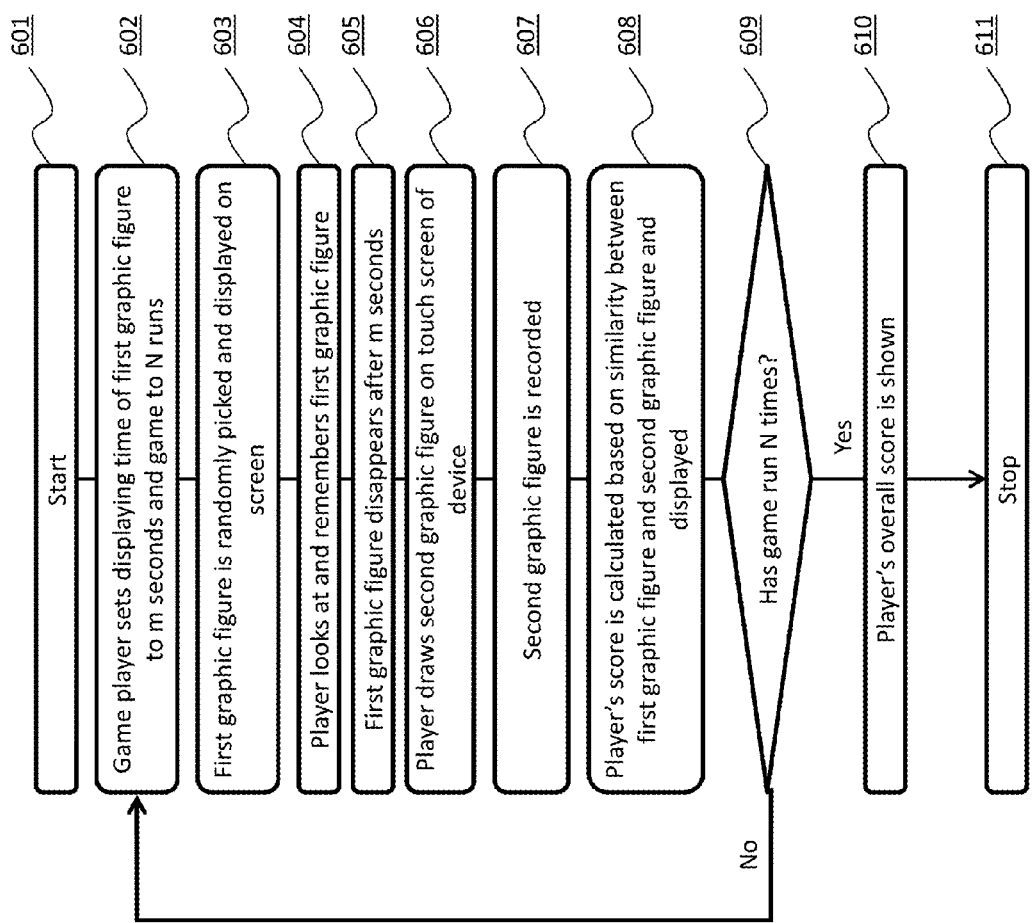
FIG. 11 is a flowchart of the gaming method involving one player according to aspects of the present disclosure in another embodiment.

FIG. 11 is a flowchart of the exemplary game method shown in FIG. 10. When a game is started (601), a time period of a first graphic figure is shown on the screen is set and a number of runs of the game is set as well (602). A first graphic figure is displayed on a screen of a device (603). A player looks at the first graphic figure and remembers the contents of the first figure (604). The first graphic figure disappears after the time period set at the beginning of the game (605). After the first graphic figure disappears the player tries to re-draw the first graphic figure by drawing a second graphic figure on a touch screen of a device (606). The second graphic figure is recorded (607). A similarity between the first figure and the second figure is evaluated and a score is calculated based on the similarity for the player (608). The program checks if the game has repeated the number of runs set at the beginning of the game (609). If the answer is "No", the process goes back to step 603 and repeats another run. If the answer is "Yes", then the player's overall score is calculated and displayed (610) and the game is stopped (611).

Figure 12:
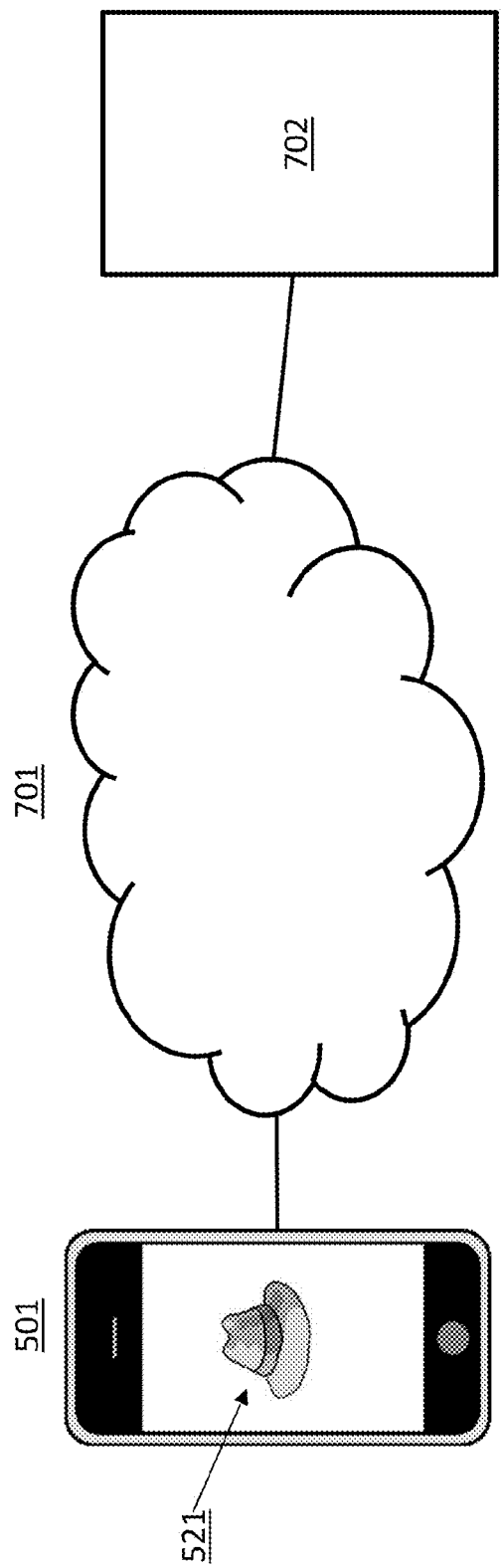
FIG. 12 is a schematic view of a gaming method involving one player with a network according to aspects of the present disclosure in one or more embodiments.

It is not necessary that the first graphic figure is picked from a local device with a database for the gaming method shown in FIG. 10. As another embodiment shown in FIG. 12 the device is able to receive a first graphic figure 521 from a remote memory device with a database 702 via a communication network 701. The communication network 701 can be a wireless phone network, Internet, or other communication networks. With the communication network the display device, the device with a touch screen, and the memory device are able to transmit graphic figures, scores and other information to each other and are able to accept graphic figures, scores and other information from each other, and are able to transmit and accept graphic figures, scores and other information to and from the network.

Figure 13:
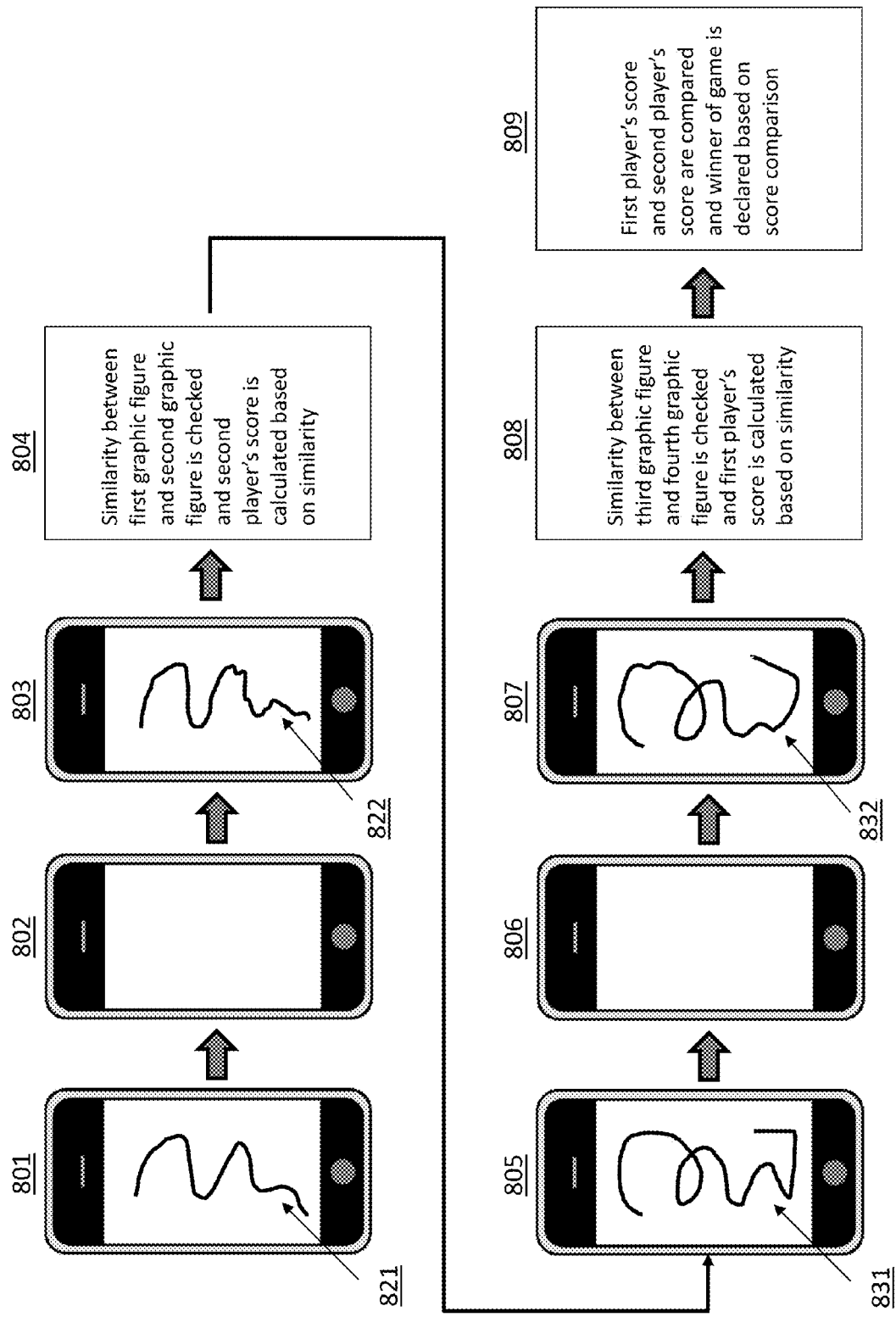
FIG. 13 is a schematic view of an application of the method of learning drawing to a gaming method involving two players according to aspects of the present disclosure in one or more embodiments.

FIG. 13 shows an exemplary embodiment of this invention's application to entertainment—a gaming method involving two or more players. When the game starts a first graphic figure 821 is drawn by a first player on a touch screen of a device (801). A second player looks at the first graphic figure and remembers the contents of the first graphic figure. The first graphic figure 821 disappears after a period of time which can be set before the beginning of the game (802). After the first graphic figure disappears the second player draws a second graphic figure 822 on a touch screen of a device (803). The second player tries to repeat the first figure and make the second figure 822 to be as similar to the first graphic figure 821 as possible. Both the first graphic figure and the second graphic figure are recorded. A similarity between the first figure and the second figure is evaluated and a first score based on the result of the evaluation is calculated for the second player (804). Then the roles of the first player and the second player are exchanged. A third graphic figure 831 is drawn by a second player on a touch screen of a device (805). The first player looks at the third graphic figure and remembers the contents of the third graphic figure. The third graphic figure 831 disappears after a period of time which can be set before the beginning of the game (806). After the third graphic figure disappears the first player draws a fourth graphic figure 832 on a touch screen of a device (807). The first player tries to repeat the third figure and make the fourth figure 832 to be as similar to the third graphic figure 831 as possible. Both the third graphic figure and the fourth graphic figure are recorded. A similarity between the third figure and the fourth figure is evaluated and a second score based on the result of the evaluation is calculated for the first player. The game may continue to have as many runs as the players want. At the end of the game the person who has an overall higher score is declared as the winner of the game.

Figure 14:
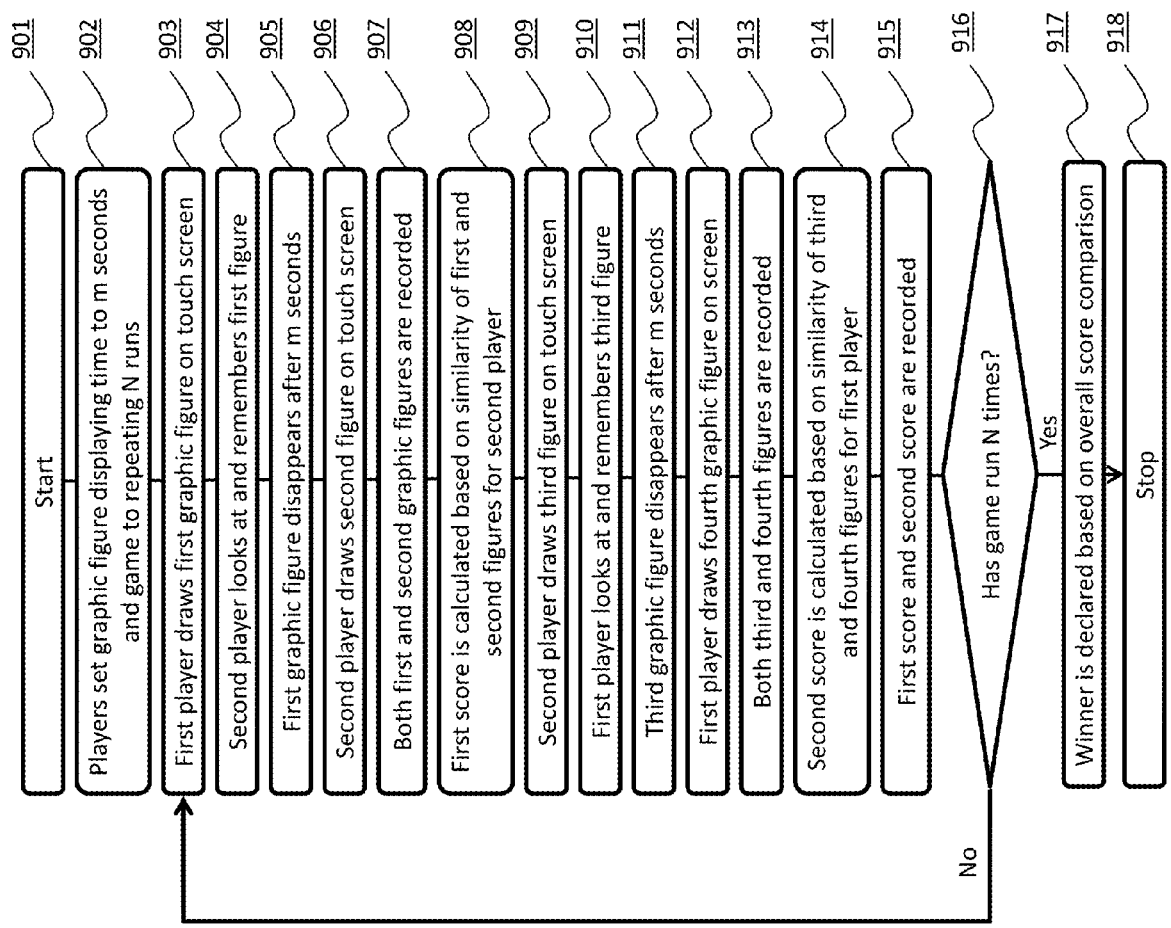
FIG. 14 is a flowchart of the gaming method involving two players according to aspects of the present disclosure in another embodiment.

FIG. 14 is a flowchart of the exemplary gaming method as shown in FIG. 13. When a game is started (901), a time period of displaying a first graphic figure and a third graphic figure on a screen is set and a number of runs of a game is set as well (902). A first player draws a first graphic figure on a touch screen (903). A second player looks at the first graphic figure and remembers the contents of the first figure (904). The first graphic figure disappears after the time period set at the beginning of the game (905). After the first graphic figure disappears the second player tries to re-draw the first graphic figure, which has been just drawn by the first player, by drawing a second graphic figure on a touch screen of a device (906). Both the first graphic figure and the second graphic figure are recorded (907). The second player's score is calculated based on similarity between the first figure and the second figure (908). Then the first player and the second player switch their roles. The second player draws a third graphic figure on a screen of a device (909). The first player looks at the third graphic figure and remembers the contents of the third graphic figure (910). The third figure disappears after the period of time set at the beginning of the game (911). After the third figure disappears, the first player tries to re-draw the third figure by drawing a fourth graphic figure on a touch screen of a device (912). Both the third figure and the fourth figure are recorded (913). The first player's score is calculated based on similarity between the third figure and the fourth figure (914). The first player's score and the second player's score are recorded (915). The game program checks if the game has repeated the number of runs set at the beginning of the game (916). If the answer is "No", the game goes back to step 903 and repeats another run. If the answer is "Yes", a winner of the game is declared based on an overall score comparison between the first player and the second player (917). Then the game stops (918).

It is not necessary the two players draw the first graphic figure, the second graphic figure, the third graphic figure, and the fourth graphic figure on the same device with a touch screen. As shown in FIG. 15 the first player and the second player can use different devices, which are connected via a communication network 1001, such as a wireless phone network, Internet, or other communication networks. With the communication network the two devices are able to transmit graphic figures, scores and other information to each other and are able to accept graphic figures, scores and other information from each other, and are able to transmit and accept graphic figures, scores and other information to and from the network.

The score of the first player is not necessary proportional to the similarity of the third graphic figure and the fourth graphic figure and the score of the second player is not necessary proportional to the similarity of the first graphic figure and the second graphic figure. For example, the first player's score can be calculated not only based on similarity between the third figure and the fourth figure, but also based on the complexity of the third graphic figure. A second figure with high similarity to a simple first figure may have same score as a second figure with low similarity to a complex first figure. In this way the second player must weigh how complicated his drawing should be to have the first player to have a low score. The same principle can be applied to the second player's score as well.

One embodiment of the present invention involves a method of learning how to draw graphic figures. A first graphic figure is displayed on a screen of a device. The first graphic figure is only displayed on the screen for a short period of time. A person looks at the first graphic figure during the time period in which it is displayed, remembers the contents of the first graphic figure. After the first figure disappears the person tries to re-draw the first graphic figure by drawing a second graphic figure on a touch screen based on remembering the first figure. After the person finishes drawing the second graphic figure both the first graphic figure and the second graphic figure are displayed and differences between the first figure and the second figure are indicated. The person improves the person's drawing skills by studying the differences.

Another embodiment of the present invention involves an application of the method to a game method involving one player. A first graphic figure, selected randomly form a database, is displayed on a first screen of a first device. The first graphic figure is only displayed on the screen to a player for a short period of time. The player looks at the first graphic figure during the time period in which it is displayed and remembers the contents of the first figure. After the first graphic figure disappears the player tries to re-draw the first figure by drawing a second graphic figure based on remembering the first figure on a touch screen of a second device. The second graphic figure is recorded. A score is calculated based on similarity between the first figure and the second figure for the player.

Yet another embodiment of the present invention involves an application of the method to a game method involving two or more players. A first player draws a first graphic figure on a touch screen. The first graphic figure is only displayed on the screen for a short period of time. A second player looks at the first graphic figure and remembers the contents of the first figure. After the first graphic figure disappears the second player tries to re-draw the first figure by drawing a second graphic figure based on remembering the first figure on the touch screen. The first figure and the second figure are recorded and a score related to similarity between the first figure and the second figure is calculated for the second player. Then the second player draws a third graphic figure on the touch screen. The third graphic figure is only displayed on the screen for a short period of time. The first player looks at the third graphic figure and remembers the contents of the third figure. After the third graphic figure disappears the first player tries to re-draw the third figure by drawing a fourth graphic figure based on remembering the third figure on the touch screen. The third figure and the fourth figure are recorded and a score related to similarity between the third figure and the fourth figure is calculated for the first player. The game continues until it is stopped. The player who has an overall higher score is declared to be a winner at the end of the game.

Especially, first graphic figure is displayed on the device screen only for a short period of time. The first graphic figure disappears before the second graphic figure is drawn. This forces the person, who tries to re-draw the first graphic figure, to remember the contents of the first figure, and to re-draw the first figure on the touch screen with the person's memory. With this approach showing the first figure only for a short period of time people will be more efficient in learning drawing graphic figures.

What is claimed is:

1. A method, comprising:
    defining a fixed period of time by a first person;
    thereafter, displaying a first graphic figure for the fixed period of time to a second person, wherein the first graphic figure is drawn by the first person;
    receiving a second graphic figure by a touch screen of a first electronic device, wherein the second graphic figure is drawn on the touch screen by the second person based on the first graphic figure after the first graphic figure disappears;
    comparing the first and second graphic figures to determine a difference between the first and second graphic figures; and
    showing a result associated with the difference by the first electronic device.

2. The method of claim 1, wherein the displaying of the first graphic figure for the fixed period of time includes displaying the first graphic figure on the first electronic device for the fixed period of time.

3. The method of claim 2, wherein the displaying of the first graphic figure on the first electronic device for the fixed period of time includes receiving the first graphic figure from a second electronic device coupled with the first electronic device.

4. The method of claim 3, wherein
    the first electronic device and the second electronic device are coupled together through one of Internet, intranet, wireless relay connection, WiFi, Bluetooth and cable; and
    the receiving the first graphic figure from the second electronic device coupled with the first electronic device includes transmitting the first graphic figure from the second electronic device to the first electronic device.

5. The method of claim 3, further comprising displaying at least one of the second graphic figure and the result on the second electronic device.

6. The method of claim 3, wherein the receiving the first graphic figure from the second electronic device coupled with the first electronic device includes receiving the first graphic figure from a database of the second electronic device.

7. The method of claim 3, wherein the receiving the first graphic figure from the second electronic device coupled with the first electronic device includes receiving the first graphic figure by a second touch screen of the second electronic device, wherein the first graphic figure is drawn on the second touch screen of the second electronic device by first person.

8. The method of claim 2, wherein the displaying the first graphic figure on the first electronic device for the fixed period of time includes receiving the first graphic figure from a database of the first electronic device or from the touch screen of the first electronic device drawn by another person.

9. The method of claim 1, wherein the first electronic device is a device selected from the group consisting of a touch screen phone, a touch screen tablet computer, a laptop computer, a flat panel display, and a desktop computer.

10. The method of claim 1, wherein the first graphic figure includes at least one of a line, a curve, a drawing, a symbol, a picture, and combinations thereof.

11. The method of claim 1, wherein the comparing the first and second graphic figures further includes analyzing a similarity between the first and the second graphic figures and a complexity of the first graphic figure.

12. The method of claim 1, wherein
the first graphic figure includes a text; and
the comparing the first and second graphic figures further includes translating the first graphic figure.

13. The method of claim 1, wherein the defining of the fixed period of time includes defining the fixed period of time by setting at beginning by the first person.

14. The method of claim 1, wherein the first graphic figure is displayed for the fixed period of time and the second graphic figure is drawn after the fixed period of time.

15. A method, comprising:
receiving a first graphic figure by a first device transmitted from a second device;
displaying the first graphic figure on a first screen of the first device for a fixed period of time to a first person, wherein the fixed period of time is determined before the displaying of the first graphic figure;
receiving a second graphic figure drawn by the first person on the first screen of the first device in a touch screen mode based on the first graphic figure after the first graphic figure disappears;
comparing the first graphic figure and the second graphic figure to determine a first difference therebetween; and
showing a result associated with the first difference, wherein
the fixed period of time is predefined by a second person; and
the first graphic figure is entered on a second screen of the second device by the second person in a touch screen mode before the first graphic figure is transmitted from the second device.

16. The method of claim 15, wherein after the fixed period of time, the first graphic figure is completely disappears from the first screen of the first device without any of a portion of the first graphic figure and a reference image of the first graphic figure on the first screen.

17. The method of claim 16, further comprising:
receiving a third graphic figure by the second device transmitted from the first device;
displaying the third graphic figure on the second screen of the second device;
receiving a fourth graphic figure drawn by the second person on the second screen of the second device in a touch screen mode based on the third graphic figure after the third graphic figure disappears;
comparing the third graphic figure and the fourth graphic figure to determine a second difference therebetween;
showing another result associated with the second difference;
comparing the result and the another result to determine a compared result; and
showing the compared result.

18. The method of claim 15, wherein at least one of the first device and the second device includes an electronic device selected from the group consisting of a touch screen phone, a touch screen tablet computer, a laptop computer, a flat panel display, and a desktop computer.

19. The method of claim 15, wherein the first and second graphic figures are a pair of figures selected from the group consisting of the first graphic figure being the drawing and the second graphic figure being the text, or the first graphic figure being the text and the second graphic figure being the drawing, or the first graphic figure being a first text and the second graphic figure being a second text, wherein the first text is in a first language and the second text is in a second language.

20. The method of claim 15, wherein
the comparing the first graphic figure and the second graphic figure includes evaluating a similarity between the first figure and the second figure;
the first difference is related to a level of the similarity; and
the result is determined with the first difference and complexity of the first graphic figure.

21. A hand-drawn figure system operable on a mobile device, comprising:
a transmission module operable to receive a first graphic figure from another mobile device through a data transmission network;
a display component operable to display the first graphic figure to a first user for a predefined fixed duration setting by a second user who draws the first graphic figure;
a touch screen operable to receive a second graphic figure drawn by the first user based on the first graphic figure after the first graphic figure disappears; and
a graphic figure processing module designed to compare the first graphic figure and the second graphic figure to determine a difference between the first and second graphic figures,
wherein the display component is operable to show a result associated with the difference.

22. The hand-drawn figure system of claim 21, wherein the mobile device is one of a smart phone and a tablet computer; and the predefined fixed duration is determined as a function of complexity of the first graphic figure.

* * * * *